United States Patent [19]
Haddock

[11] Patent Number: 4,700,840
[45] Date of Patent: Oct. 20, 1987

[54] DATA CARD CASSETTE

[75] Inventor: Richard Haddock, Redwood City, Calif.

[73] Assignee: Drexler Technology Corporation, Mountain View, Calif.

[21] Appl. No.: 829,720

[22] Filed: Feb. 14, 1986

[51] Int. Cl.⁴ .............................................. B65D 43/12
[52] U.S. Cl. ...................................... 206/449; 206/37; 206/39; 206/307; 235/487; 235/488; 360/2; 369/273; 369/286
[58] Field of Search ............ 40/10 B, 10 R, 16, 158 B, 40/158 R, 159; 206/37, 38, 39, 39.1–39.8, 307, 308, 309–313, 444, 449, 454–456; 235/487, 488, 493; 360/2; 369/273, 283, 284, 286

[56] References Cited

U.S. PATENT DOCUMENTS

| 3,608,714 | 9/1971 | Cox | 235/487 |
| 3,951,264 | 4/1976 | Heidecker et al. | 206/444 |
| 4,084,694 | 4/1978 | Lainez et al. | 206/444 |
| 4,109,919 | 8/1978 | Elliott et al. | 274/9 B |
| 4,159,417 | 6/1979 | Rubincam | 235/375 |
| 4,159,827 | 7/1979 | Torrington | 274/9 B |
| 4,164,782 | 8/1979 | Stewart | 360/133 |
| 4,202,445 | 5/1980 | Porter | 206/37 |
| 4,419,710 | 12/1983 | Sugiyama et al. | 360/133 |
| 4,609,812 | 9/1986 | Drexler | 235/493 |

FOREIGN PATENT DOCUMENTS 2853262  6/1979  Fed. Rep. of Germany ...... 369/284

Primary Examiner—Jimmy G. Foster

[57] ABSTRACT

A cassette having a drawer composed of a rigid support shelf and one or two data cards mounted to the shelf, and a rigid cassette case having sides defining a slot at a front end in the case for edgewise insertion of the drawer into the case. The drawer has at least one and preferably two holes at a front end therein coinciding with notches in sides of the case. A boss on either the drawer or the case is received by a groove in the other when the cassette is closed, thereby forming a detent. A second boss and groove may be provided on the opposite side. Each data card may be composed of a thin backing sheet adhered to the shelf, a strip of laser recording material disposed on the backing sheet and a transparent scratch-resistant plastic cover disposed over the strip.

13 Claims, 3 Drawing Figures

U.S. Patent  Oct. 20, 1987  4,700,840
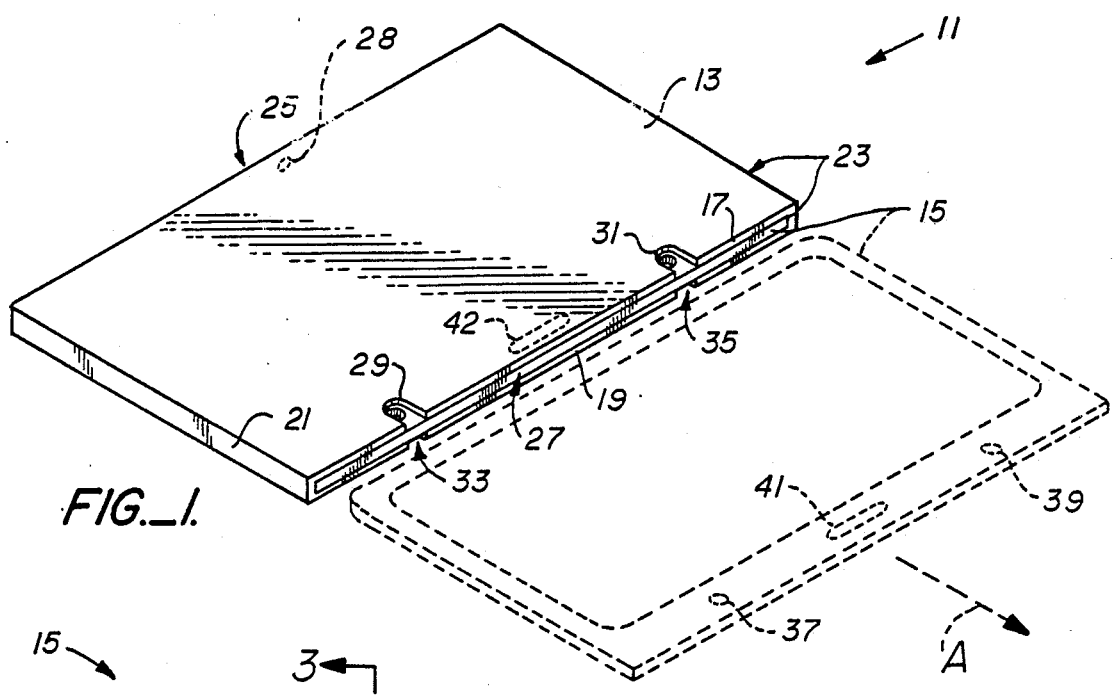
FIG._1.
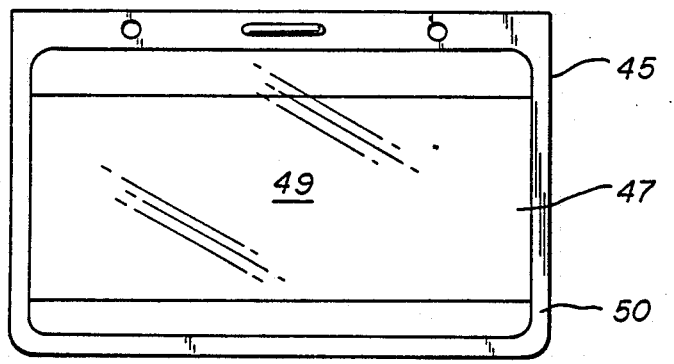
FIG._2.
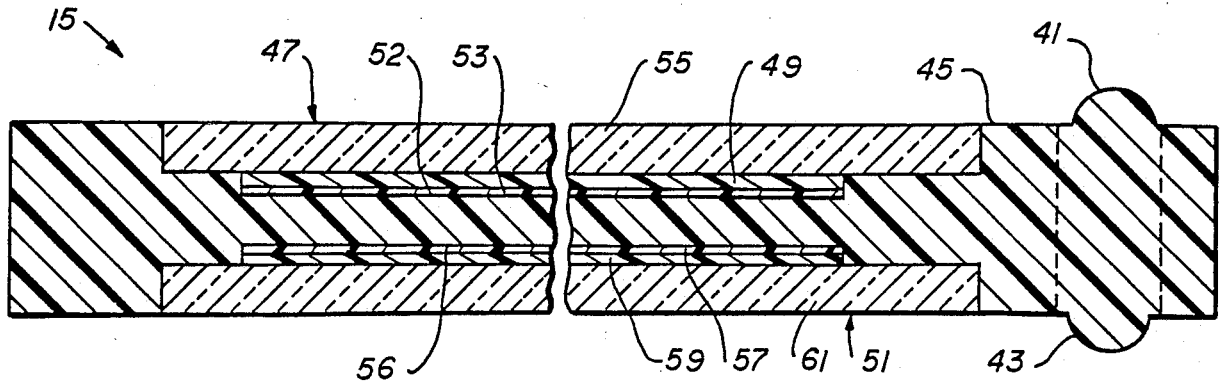
FIG._3.

DATA CARD CASSETTE

DESCRIPTION

1. Technical Field

The present invention relates to protective receptacles for data storage devices and in particular to slotted jackets for storage of disks, cards, and the like.

2. Background Art

In U.S. Pat. No. 4,159,417, Rubincam discloses a holographic card comprising a photographic film mounted in a plastic card. Each card may contain several hundred pages of information, i.e., about four million encoded bits, so that an entire book can be stored on the card. The card may be kept in a case for protection when the card is not being used.

In U.S. Pat. No. 4,084,694, Lainez et al. disclose a container for video discs including a support for the disc and a protective envelope which is open along one edge to allow the support to be inserted laterally into the envelope. One or two shaped openings or holes in the support may be engaged in suitable latching members or hooking structures, such as studs or rods, to allow semiautomatic transfer of the support and to obtain a correct positioning of the support relative to a playback apparatus. An aperture or clearance is provided in the jacket to leave open the openings or holes, permitting the handling of the support.

In U.S. Pat. No. 4,109,919, Elliott et al. discloses a sleeve-type jacket and a record retaining tray in which the tray includes a pair of detents which are received in depressions provided in the jacket when the tray is fully inserted into the jacket. The detents prevent inadvertent slippage of an enclosed video disc from the jacket.

Optical data cards have an advantage over disks in that they are small, thin and light weight, making them quite easy to handle and transport. Optical data cards that are used as electronic books or as prerecorded data bases require a large data capacity and thus small data spots having diameters on the order of ten microns or less. When such small data spots are used, the cards require thick protective coatings to keep scratches and dirt particles on the coating surface out of focus. As part of electronic book libraries, the cards would be subject to handling by many users and in varied environments, causing scratching and accumulation of dirt and possible loss of data.

An object of the present invention is to produce a special protective receptacle for data cards which facilitates automated removal of the card from the receptacle, which can be mailed, carried in a pocket, or used in dirty environments without damage to the card and loss of data.

DISCLOSURE OF THE INVENTION

The above object has been met with a data card cassette comprising a thin flat drawer having a rigid support shelf and a wallet-size data card mounted on the shelf, and a thin, rigid box-like cassette case having sides or walls defining an open side or slot at a front end in the case for edgewise insertion of the drawer into the case. A second wallet-size data card may be mounted on the opposite side of the shelf from the first data card. The drawer has at least one hole, and preferably two, at a front end of the shelf and the case has a notch in a side coinciding with each hole for removal of the drawer from the case. A boss on either the drawer or the case is received by a groove in the other when the cassette is closed, thereby forming a detent. The detent may also include a second boss and groove on the opposite side from the first boss and groove. The data card may be composed of a backing sheet, a strip of laser recording material disposed on the backing sheet and a transparent scratch-resistant protective cover plate disposed over the laser recording material.

The data card cassette may be mailed or carried in pockets without causing damage to the laser recording material, thus making it especially applicable as an electronic book. It may be used in dirty environments, for example, a military manual used in the field. It can be stored on racks and used with an automatic cassette loader in a "jukebox" arrangement.

BRIEF DESCRIPTION OF THE DRAWINGS

FIG. 1 is a perspective view of a data card cassette in accord with the present invention.

FIG. 2 is a top plan view of a drawer with data card, illustrated by dashed lines in FIG. 1.

FIG. 3 is a side sectional view of the drawer taken along the line 3—3 in FIG. 2.

BEST MODE FOR CARRYING OUT THE INVENTION

With reference to FIG. 1, a data card cassette 11 comprises a box-like cassette case 13 and a data card drawer 15. Cassette case 13 has top, bottom, left, right and back sides or walls 17, 19, 21, 23 and 25 respectively defining an open side or slot 27 at a front end in cassette case 13 for edgewise insertion of drawer 15 into the case. A vent hole 28 in rear wall 25 facilitates air escape upon insertion of drawer 15 into cassette case 13. Typically, case 13 is made from a rigid plastic, but other materials may also be used. Drawer 15 is typically a rectangular piece only slightly smaller than case 13. Slot 27 is of a size and shape so as to receive drawer 15 snugly. When in place in the case, the front edge of drawer 15 closes the opening of slot 27, thereby effecting a semi-seal to keep out dirt. By way of example, case 13 may have dimensions approximately 5 mm by 59 mm by e93 mm and slot 27 and drawer 15 may have dimensions approximately 2 mm by 57 mm by 89 mm. Sides 17, 19, 21, 23 and 25 are thus approximately one to two millimeters thick. These dimensions are not critical, but preferred because such a size easily fits into a pocket and is easy to handle.

Cassette case 13 has two notches 29 and 31 cut into the front edge of top side 17. A pair of notches 33 and 35 may also be present in the front edge of bottom side 19 of case 13 coinciding with notches 29 and 31 respectively. Notches 29, 31, 33 and 35 coincide with two holes 37 and 39 in a front end of drawer 15. Drawer 15 may thus be removed from case 13 for reading of the data contained thereon or writing data thereto by putting a ballpoint or similar tool in one of the holes and pulling drawer 15 out of slot 27 in the direction indicated by arrow A. Automatic sound cassette loaders, such as one produced by Aiwa, could easily be adapted for automatically loading card cassette 11. A pair of pins or the like would be inserted into holes 37 and 39 and drawer 13 pulled out of slot 27. Although two holes 37 and 39 are preferred for automatic removal, only one hole is needed for manual removal.

Drawer 15 has a raised boss 41. A groove 42 is in a position in top side 17 in slot 27 for receiving boss 41 when cassette 11 is closed, i.e., when drawer 15 is fully inserted into case 13. Together, the groove and boss 41 form a detent for locking the drawer in place. Since top and bottom sides 17 and 19 respectively are thin, typically about one to two millimeters thick, they yield somewhat to permit boss 41 to enter slot 27 and slide into the groove 42. Boss 41 is shown as being positioned at the front edge of drawer 15 between holes 37 and 39, but the positioning is not critical and may be anywhere data is not recorded. The placement of boss and groove may be reversed, with the groove in drawer 15 and boss 41 on top side 17 in slot 27. A second pair of a boss 43 and groove, not shown, may also be provided on the opposite side of drawer 15 from boss 41 and on bottom side 19 in slot 27. Second boss 43 is shown in FIG. 3.

With reference to FIG. 2, drawer 15 comprises a shelf 45 and a wallet-size data card 47 mounted in a shallow depression of shelf 45. Data card 47 has a strip 49 of laser recording material thereon forming a central data region with recorded information thereon. Typically, the size of the data card is slightly smaller than the shelf such as to fill a substantial portion of the surface of shelf 45, yet also provide a border or handling edge 50 around the card. For a drawer 15 having the dimensions given in the example above, data card 47 typically has a width dimension of approximately 47 mm and a length dimension of approximately 82 mm. The strip 49 of laser recording material is typically about 35 mm wide. Alternatively, strip 49 may have other sizes and orientations. Drawer 15 may also have a second data card 51 like first data card 49, mounted to the opposite side of shelf 45, as shown in FIG. 3.

The high resolution laser recording material which forms strip 49 may be any of the reflective recording material which have been developed for use as direct read-after-write (DRAW) optical disks, so long as the materials can be formed on thin substrates. An advantage of reflective materials over transmissive materials is that the read/write equipment is all on one side of the card and automatic focus is easier. For example, the high resolution material described in U.S. Pat. No. 4,230,939 issued to de Bont, et al. teaches a thin metallic recording layer of reflective metals such as Bi, Te, In, Sn, Cu, Al, Pt, Au, Rh, As, Sb, Ge, Se, Ga. Materials which are preferred are those having high reflectivity and low melting point, particularly Cd, Sn, Tl, In, Bi and amalgams. Suspensions of reflective metal particles in organic colloids also form low melting temperature laser recording media. Silver is one such metal. Typical recording media are described in U.S. Pat. Nos. 4,314,260, 4,298,684, 4,278,758, 4,278,756, 4,269,917, 4,284,716, and 4,312,938 all assigned to the assignee of the present invention.

The laser recording material which is selected should be compatible with the laser which is used for writing on it. Some materials are more sensitive than others at certain wavelengths. Good sensitivity to near-infrared light is preferred because infrared is affected least by scratches and dirt on the transparent laminating sheet. The selected recording material should have a favorable signal-to-noise ratio and form high contrast data bits with the read/write system with which it is used. The material should not lose data when subjected to temperatures of about 122° F. (50° C.) for long periods. The material should also be capable of recording at speeds of at least several thousand bits/sec. This generally precludes the use of materials that require long heating times or that rely on slow chemical reactions in the presence of heat, which may permit recording of only a few bits/sec. A large number of highly reflective laser recording materials have been used for optical data disk applications.

Data is recorded by forming spots in the surrounding field of the reflective layer itself, thereby altering the reflectivity in the data spot. The spots have a recommended size of approximately 5 microns by 20 microns, or circular spots 5 microns or 10 microns in diameter. Generally, the smallest dimension of a spot should be less than 50 microns. In the preferred embodiment the largest dimension would also be less than 50 microns. The beam should deliver sufficient laser pulse energy to the surface of the recording material to create spots. Typically, 5–20 milliwatts is required, depending on the recording material. A 20 milliwatt semiconductor laser, focussed to a five micron beam size, records at temperatures of about 200° C. and is capable of creating spots in about 75 microseconds. The wavelength of the laser should be compatible with the recording material. In the read mode, power is lowered to about 5% of the record power.

Data is read by detecting the optical reflective contrast between the surrounding reflective field of unrecorded areas and the recorded spots. Spot reflectivity of less than half the reflectivity of the surrounding field produces a contrast ratio of at least two to one, which is sufficient contrast for reading. Greater contrast is preferred. Reflectivity of the strip field of about 50% is preferred with reflectivity of a spot in the reflective field being less than 10%, thus creating a contrast ratio of greater than two to one. Alternatively, data may also be recorded by increasing the reflectivity of the strip. For example, the recording laser can melt a field of dull microscopic spikes on the strip to create flat shiny spots. This method is described in SPIE, Vol. 329, Optical Disk Technology (1982), p. 202. A spot reflectivity of more than twice the surrounding spiked field reflectivity produces a contrast ratio of at least two to one, which is sufficient contrast for reading.

With reference to FIG. 3, data card 47 is seen to comprise a thin backing sheet 53, a strip of laser recording material 49 and a transparent scratch-resistant front cover 55. Backing sheet 53 is a dielectric, usually a plastic material such as polycarbonate or polyvinyl chloride. Moisture barrier materials, such as polychlorotrifluoroethylene (P-CTFE), marketed by Allied Corp. under the tradename Aclar, are preferred. Backing sheet 53 carries strip 49 disposed thereon. Typically, backing sheet 53 is approximately 2 mils (50 microns) thick and is flexible. Sheet 53 is adhered in a shallow depression 52 of shelf 45.

The strip 49 of laser recording material is described above with reference to FIG. 2. Typically, strip 49 is about 4 mils (100 microns) thick, although this is not critical. Strip 49 may be applied to backing sheet 53 by any convenient method which achieves flatness or may be formed in situ on the sheet.

Front cover 55 is disposed over strip 49. Cover 55 may be a transparent plastic sheet laminating material or a coating, such as a transparent lacquer. The material may be made from polycarbonate, acrylates or other plastic materials. Moisture barrier materials, such as P-CTFE mentioned above, are preferred. Typically, cover 55 is approximately 15 mils (380 microns) thick, and is flush with shelf 45, but this is not critical.

In FIG. 3, drawer 15 is double sided. A second data card 51 is mounted in a shallow depression 56 to the opposite side of shelf 45 and comprises a backing sheet 57, a strip 59 of laser recording material and a cover 61 like sheet 53, strip 49 and cover 55 described above. Two data cards 47 and 51 are preferred, since for identical cards data capacity is doubled.

The card cassette described here typically has a data capacity of approximately four megabytes, and is thus applicable for use as an electronic book or manual. During mailing or storage the case provides an enclosed dust-free environment for the optical data card on the drawer inside.

I claim:

1. A cassette comprising,
   a movable drawer supporting a first wallet-size data card with a strip of laser recording material thereon, said data card being integral with said drawer, said drawer also having a detent and a means for pulling said drawer at a front end of the drawer, and
   a cassette case having sides defining a slot at a front end in said case, said slot being of a size and shape to slidably receive said drawer, said drawer being selectively removable from said cassette case.

2. A cassette comprising,
   a movable drawer supporting a first wallet-size data card with a strip of laser recording material thereon, said data card being mounted to said drawer, said drawer also having a detent and a means for pulling said drawer at a front end of the drawer,
   a cassette case having sides defining a slot at a front end in said case, said slot being of a size and shape to slidably receive said drawer, and
   a second wallet-size data card mounted to said drawer on a side opposite said first data card, said second data card having a strip of laser recording material thereon.

3. The cassette of claim 1 wherein said detent comprises at least one boss on either one of said drawer and said case, and a groove for each said boss in the other of said drawer and said case, said groove receiving said boss.

4. A data card cassette comprising,
   a drawer having a shelf and a first wallet-size data card with a strip of laser recording material thereon, said first data card supported on said shelf, said first data card being integral with said drawer, said drawer also having at least one hole at a front end of said shelf,
   a cassette case having sides defining a slot at a front end of said case, said slot being of a size and shape to releasably receive said drawer, said case also having a notch in a side coinciding with each said hole, and
   a detent having at least one boss and a groove for each said boss, said boss being on either one of said drawer and said case, said groove being in the other of said drawer and said case in a position for receiving said boss.

5. A data card cassette comprising,
   a drawer having a shelf and a first wallet-size data card with a strip of laser recording material thereon, said first data card supported on said shelf, said drawer also having at least one hole at a front end of said shelf,
   a cassette case having sides defining a slot at a front end of said case, said slot being of a size and shape to receive said drawer, said case also having a notch in a side coinciding with each said hole,
   a detent having at least one boss and a groove for each said boss, said boss being on either one of said drawer and said case, said groove being in the other of said drawer and said case in a position for receiving said boss, and
   a second wallet-size data card with a strip of laser recording material thereon, said second data card being mounted on said shelf on an opposite side from first data card.

6. The data card cassette of claim 4 wherein said detent comprises a pair of bosses and a pair of grooves in positions for receiving said bosses, each of said pair of bosses being on either one of said drawer and said case on an opposite side from said other of said pair of bosses.

7. A data card cassette comprising,
   a drawer having a shelf and a first wallet-size data card having a backing sheet with a strip of laser recording material thereon, said first data card having a transparent scratch-resistant protective cover disposed over said laser recording material, said backing sheet being adhesively bonded in place to said shelf, said drawer also having at least one hole at a front end of said shelf,
   a cassette case having sides defining a slot at a front end of said case, said slot being of a size and shape to receive said drawer, said case also having a notch in a side coinciding with each said hole, and
   a detent having at least one boss and a groove for each said boss, said boss being on either one of said drawer and said case, said groove being in the other of said drawer and said case in a position for receiving said boss.

8. A cassette for an optical data card comprising,
   a thin box-like cassette case having upper and lower walls and three side walls, and having one open side, each of the upper and lower walls having at least one notch in the lateral edge proximate to said open side, at least one of the upper and lower walls having a detent on an edge of an inside surface of the walls proximate to the open side, and
   a thin flat drawer having outside dimensions of length and thickness less than the inside dimensions of said case so as to be enclosed inside said case by insertion through said open side, the drawer having at least one surface having a shallow depression of dimensions to allow seating of an optical data card therein, the drawer having a border with at least one hole placed therein so as to align with said notch, said drawer having a boss on the border proximate to the hole, and said boss aligned with the detent, whereby the card may be removably held in place.

9. The cassette of claim 8 further defined by a rear side wall, distal to the open side, having a hole defined therein.

10. The cassette of claim 8 wherein said case and drawer have sufficient flexibility to allow insertion of the drawer boss into the case detent for locking the drawer in the case.

11. The cassette of claim 8 wherein said optical data card comprises
    a flexible backing sheet adhered in said depression to said drawer,
    a laser recording material disposed on said backing sheet, and
    a transparent scratch-resistant protective cover disposed over said laser recording material.

12. A data card cassette comprising,
a drawer having a shelf and first and second wallet-size data cards mounted on opposite sides of said shelf, each of said data cards having a flexible backing sheet adhered to said shelf, a strip of laser recording material disposed on said backing sheet and a transparent scratch-resistant protective cover disposed over said laser recording material, said drawer also having a means for pulling said drawer at a front end of said shelf,
a cassette case having sides defining a slot at a front end of the case, said slot being of a size and shape to receive said drawer, and
a detent having a pair of bosses and a pair of grooves, said bosses being on opposite sides on either one of said drawer and said case, said grooves being in the other of said drawer and said case in position for receiving said bosses.

13. A cassette for an optical data card comprising,
a planar cassette case having three side walls, one open side and opposed upper and lower walls, said upper and lower walls having two spaced apart notches cut into the lateral edges proximate to the open side, the upper and lower walls having a detent on the inside surface of the lateral edges between said notches, and
a planar card drawer of height, width and length to fit inside said housing by insertion through the open side, said drawer having an optical data card and a shelf with shallow depressions in the top and bottom surfaces for flush mounting of said optical data card into each depression, said drawer having spaced apart holes cut through one lateral edge matching the alignment of the notches in the case lateral edges for removal of the holder from the case, said drawer having a boss on the lateral edges of both the upper and lower surfaces between said holes, and said bosses aligned with the detents on the inside surfaces of the case top and bottom walls for retention of the drawer inside the case.

* * * * *